(12) United States Patent
Spagnolo

(10) Patent No.: US 6,250,056 B1
(45) Date of Patent: Jun. 26, 2001

(54) ROTARY BLADE PRUNING MACHINE

(75) Inventor: Fred Spagnolo, Mildura (AU)

(73) Assignee: F & T Spagnolo PTY Ltd., Victoria (AU)

( * ) Notice: Subject to any disclaimer, the term of this patent is extended or adjusted under 35 U.S.C. 154(b) by 0 days.

(21) Appl. No.: 09/349,464

(22) Filed: Jul. 9, 1999

Related U.S. Application Data

(63) Continuation-in-part of application No. PCT/AU98/00002, filed on Jan. 5, 1998.

(51) Int. Cl.$^7$ .................................................. A01D 33/02
(52) U.S. Cl. ................................ 56/235; 56/255; 56/503
(58) Field of Search .............................. 56/235, 255, 291, 56/244, 292, 295, 6, 13.6, 16.3, 256, 504, 11.9, 15.2

(56) References Cited

U.S. PATENT DOCUMENTS

| | | | |
|---|---|---|---|
| 2,038,284 | * | 4/1936 | Hanson .................................. 56/11.8 |
| 2,648,942 | * | 8/1953 | Grant et al. ............................ 56/14.3 |
| 3,138,911 | * | 6/1964 | Pounds .................................... 56/235 |
| 4,183,196 | * | 1/1980 | Oosterling et al. ..................... 56/295 |
| 4,227,365 | * | 10/1980 | Van Der Lely et al. ............. 56/13.6 |
| 4,237,679 | * | 12/1980 | Van Der Lely ....................... 56/13.6 |
| 4,250,699 | * | 2/1981 | Hallberg ................................. 56/235 |
| 4,302,922 | * | 12/1981 | Guerndt, Jr. et al. ................. 56/235 |
| 4,887,418 | * | 12/1989 | Pelletier ............................... 56/249.5 |
| 4,888,939 | * | 12/1989 | Crane .................................... 56/13.6 |
| 4,890,445 | * | 1/1990 | Crane .................................... 56/13.6 |
| 5,012,635 | * | 5/1991 | Walters et al. ........................ 56/13.6 |
| 5,209,054 | * | 5/1993 | Lawson ................................. 56/300 |
| 5,430,999 | * | 7/1995 | Grant .................................... 56/11.9 |
| 5,732,539 | * | 3/1998 | Loftus ................................... 56/291 |
| 5,845,474 | * | 12/1998 | Loftus ................................... 56/235 |
| 5,904,033 | * | 5/1999 | Landeis ................................. 56/235 |

FOREIGN PATENT DOCUMENTS

| | | |
|---|---|---|
| 0 147 344 A2 | 7/1985 | (EP) . |
| 0 312 126 A1 | 4/1989 | (EP) . |
| 0 696 416 A1 | 2/1996 | (EP) . |
| 2 018 558 | 10/1979 | (GB) . |

* cited by examiner

Primary Examiner—Robert E. Pezzuto
Assistant Examiner—Árpád F. Kováacs
(74) Attorney, Agent, or Firm—Oliff & Berridge, PLC.

(57) ABSTRACT

A pruning machine, for pruning or trimming a row of vines or other plants, includes first and second sets of pruning apparatus. The first set includes a first mounting plate having a central axis and an outer edge, a first set of blades mounted on the first mounting plate and protruding outwardly from the outer edge, a second mounting plate having a central axis and an outer edge located close to the first mounting plate so that the respective central axes and outer edges substantially coincide, and a second set of blades mounted on the second mounting plate and protruding outwardly from the second mounting plate outer edge. In operation, the first set of blades rotates relative to the second set of blades so that scissor like cutting actions are formed between them. The blades on the first mounting plate and/or the blades on the second mounting plate taper from a broader width at the outer edge of the respective mounting plate to a narrower width at the point furthest from the central axis. The second set of pruning apparatus has the same features as the first set. The two sets of pruning apparatus are mounted side by side such that they form a cutting tool for cutting one side of the row of vines or other plants, the cutting tool having a length which is approximately the sum of the diameters of the first mounting plate on the first set of pruning apparatus and the second mounting plate on the second set of pruning apparatus.

10 Claims, 6 Drawing Sheets

ROTARY BLADE PRUNING MACHINE

This is a Continuation-in-Part of Application No. PCT/AU98/00002 filed Jan. 5, 1998. The entire disclosure of the prior application(s) is hereby incorporated by reference herein in its entirety.

This invention relates to pruning apparatus. It relates particularly but not exclusively to tractor mounted rotary blade pruning apparatus which is suitable for high speed pruning of vines, fruit trees and other vegetation.

Pruning is a necessary part of most commercial fruit and plant harvesting enterprises. Pruning at particular points in a plant's growth cycle results in optimised production of fruit or other harvestable plant matter.

There are several different ways in which pruning can be accomplished. It may be performed manually by means of shears or a slasher. This enables precise control of the regions which are to be pruned, but is very labour intensive and usually not viable for commercial activities.

There are various different types of motorised devices which are used in pruning. One type of device which can be used is a rotary saw, which consists of a disk with outwardly protruding teeth, rotating rapidly. However, rotary saws with their teeth protruding in all directions are relatively dangerous to operate, and they are not therefore the preferred choice for pruning operations. Moreover, a particular difficulty in pruning vegetation is that the vegetation tends to bend easily, and not to be brittle. Accordingly, a rotary saw or a conventional saw tends to push the material outside of the teeth, and the vegetation remains uncut unless the saw operates at particularly high speeds or there is some force applied causing the vegetation to enter the teeth of the saw.

It is possible to use a motor mower-type blade-and-disk arrangement for pruning purposes. In such an arrangement, substantially rectangular blades are moved rapidly in a circular motion by a disk, and they perform a slashing type operation on vegetation. However, the blades suffer the same problem as the teeth of a rotary saw, in that vegetation tends to bend around the sides of the path traced by the blades, rather than being cut by the blades unless it is directly forced into the path of the blades.

Another type of pruner, and perhaps the most common presently available type, consists of two blades, each of which has a number of rectangular teeth. One blade is held still, while the other blade is moved rapidly backwards and forwards in the direction of the length of the blades, so that the gaps between the rectangular teeth on the two respective blades are rapidly closed and opened in cutting actions. The relative scissor-type movement of two blades results in a much improved cutting efficiency. However, vegetation still tends to bend out of the path of the square teeth.

In an improved version of the linear motorised pruning device, the rectangular teeth are replaced with substantially triangular teeth. It has been found that this arrangement results in an improved cutting efficiency, because vegetation approaching the pruner is confronted by a point rather than the flat surface on the top of a rectangular tooth. However, there are inherent inefficiencies associated with driving a blade up and down in a piston-like manner. Maximum speed of operation is limited and various stresses are incurred through the abrupt motions. Moreover, when any of the teeth are broken, bent or otherwise damaged, it is generally necessary to replace the whole blade.

According to the present invention, there is provided a pruning machine, for pruning or trimming a row of vines or other plants, including I. a first set of pruning apparatus including:
  (a) a first mounting plate having a central axis and an outer edge;
  (b) a first set of blades mounted on the first mounting plate and protruding outwardly from the outer edge;
  (c) a second mounting plate having a central axis and an outer edge located close to the first mounting plate so that the respective central axes and outer edges substantially coincide; and
  (d) a second set of blades mounted on the second mounting plate and protruding outwardly from the second mounting plate outer edge;
  wherein in operation, the first set of blades rotates relative to the second set of blades so that scissor like cutting actions are formed between them;
  and wherein the blades on the first mounting plate and/or the blades on the second mounting plate taper from a broader width at
  the outer edge of the respective mounting plate to a narrower width at the point furthest from the central axis; and
II. a second set of pruning apparatus having the same features as the first set;
wherein the two sets of pruning apparatus are mounted side by side such that they form a cutting tool for cutting one side of the row of vines or other plants, the cutting tool having a length which is approximately the sum of the diameters of the first mounting plate on the first set of pruning apparatus and the second mounting plate on the second set of pruning apparatus.

The first mounting plate may be of any suitable shape and configuration. A preferred shape is a disk shape, but other shapes such as polygonal shapes, star shapes and cartwheel type shapes are also suitable. It is preferred that the first mounting plate be flat, although other shapes such as a bowl shape are also suitable.

The second mounting plate may be of any suitable shape and configuration. The preferred shapes and features are similar to those for the first mounting plate. The second mounting plate may be fixed while the first mounting plate rotates. Alternatively, the second mounting plate may rotate in a direction opposite to that in which the first mounting plate rotates. Where the second mounting plate is fixed, it may be semi-circular or some other shape which is not continuous in the full path of the rotating blades, because it is only necessary that fixed blades be provided at the locations at which cutting actually occurs.

The rotating mounting plates are preferably relatively heavy, so that they act as flywheels, applying a steady weighted force to enhance the cutting effect of the blades. This reduces the variability of load applied to the driving motor during cutting (high load when cutting thick vegetation, no load when not cutting), and results in reduced motor wear and an overall reduction in the power required of the motor. It also reduces the speed at which blades must rotate to cut vegetation effectively. As a result, suitable machines according to the present invention may be made using the standard hydraulics available on tractors, without requiring the use of an external power pack.

As a preferred feature, recesses may be provided in the first mounting plate for the attachment of blades, so that the faces of the mounting plates including the blades as presented to each other, are relatively smooth, ensuring smooth operation during rotation, and enabling the first set of blades to pass as close as possible to the second set of blades.

The blades in the first set and in the second set may be of any suitable shape and configuration. In the preferred configuration, all blades taper from a relatively broad width at the point at which the blades begin protruding outwardly from the mounting plate to a relatively narrow width or point at the part of the blade most distant from the mounting plate. In one preferred embodiment, the blades are triangular in shape, with the base of the triangle being fixed to the mounting plate and the apex of the triangle being the outermost part of the blade. In another embodiment, the blades may be of saw-tooth shape, being a triangular shape which has been distorted into a hook type or dorsal fin shape.

It is preferred although not essential that the blades on the second mounting plate be of the same shape as the blades on the first mounting plate. Nevertheless, it is possible, by way of example, for one set of blades to be substantially rectangular in shape while the other set is substantially triangular, or for one set to be substantially triangular and the other to be substantially saw-tooth in shape, or even for there to be variations in shape within a set.

It is preferred that the blades be easily removable and replaceable on the mounting plate. This has several advantages. One advantage is that, when one blade bends or breaks or is otherwise damaged, it can be replaced without having to replace the whole mounting plate with all blades. Another advantage is that, for different applications, some blades can be removed. For example, every second blade could be removed, or every third blade, or two out of every three blades could be removed. The optimum spacing of blades depends on the nature of the material being cut, the sharpness of the blades, and the speed of rotation.

It is preferred that serrated edges be provided on the blades, enabling the blades to achieve a firmer grip on the vegetation, and aiding in the cutting process.

When the second mounting plate is fixed rather than rotating, normally only a small portion of the circumference of the plate will be facing towards the material which is being cut. Blades on the second plate need only be present in the areas in which cutting actually occurs, and typically this means that blades on the second plate are required only for half the circumference or less. It is preferred that a guard be provided around the areas at which cutting does not occur, for safety reasons.

The pruning apparatus may be powered by any suitable means. Suitable means include hydraulic motors and electric motors. Hydraulic motors are especially preferred.

The pruning machine may include means for mounting on a tractor or other suitable device for holding the mounting plates such as a harvester. It is preferred that the means for mounting be adjustable so that the height and orientation of the mounting plates and their blades can be adjusted as required. In particular, it is preferred that the mounting means is adjustable to provide at least a horizontal orientation for the machine, allowing the machine to trim the bottoms of vines horizontally, and a vertical orientation for the machine, allowing the machine to prune the sides of vines vertically. More preferably, the orientation of the machine is infinitely adjustable, allowing the operator to choose an appropriate angle after considering the slops (if any) of the land on which the pruning or trimming is being done and the desired angle of pruning or trimming.

In one preferred configuration, the first and second sets of pruning apparatus have their rotating blades operating in opposite directions such that vegetation is urged by the rotating blades towards the centre of the two sets of pruning apparatus. It is preferred that the direction of rotation of the rotating blades be reversible. This allows for rapid cleaning of the blades, simply by reversing their direction of rotation, and it also allows the operator flexibility in the manner in which the apparatus is used.

The pruning machine may further include a flexible draw-in device for drawing vegetation in towards the rotating blades. The draw-in device may be a simple spring-loaded projecting arm, or it may be a more elaborate arrangement which includes rotating flexible arms. In either event, it is preferred that the draw-in device be spring-retractable, so that damage is avoided when a post, sprinkler or other solid fixture is encountered. In an especially preferred arrangement, the flexible draw-in device includes a further pair of mounting plates with outwardly protruding blades, at least one of the plates rotating relative to the other to provide a scissor-like cutting effect. In this arrangement, it is preferred that a guard be provided for the draw-in device, mounted below or above the blades, to ensure that the draw-in device is retracted without damaging the blades or a vine if a solid object such as a fence post or a vine trunk is encountered.

The pruning apparatus may include one or more further sets of pruning apparatus arranged at an angle relative to the first set, enabling the apparatus to cut vegetation to a predefined shape. In one preferred arrangement, the pruning machine is oriented with the two sets of pruning apparatus in a vertical orientation, and a further set of pruning apparatus is provided at the top, oriented horizontally. This enables box pruning, with the tops of a row of vines being pruned horizontally at the same time as one side of the row is being pruned vertically.

Another preferred arrangement is designed especially to facilitate green trimming of vines prior to machine harvesting. Grapes typically cluster close to the centre of the vines, and harvesting is facilitated by removing foilage from outside and underneath the grape clusters. Accordingly, a preferred configuration for this involves orienting the two sets of pruning apparatus (optionally including a third set as well) in a vertical orientation, for trimming the sides of the vines, and at the bottom adding two smaller sets of pruning apparatus oriented substantially or partly horizontally, for trimming below the vines.

The invention will hereinafter be described in greater detail by reference to the attached drawings which show example forms of the invention. It is to be understood that the particularity of those drawings does not supersede the generality of the preceding description of the invention.

Figure 1:
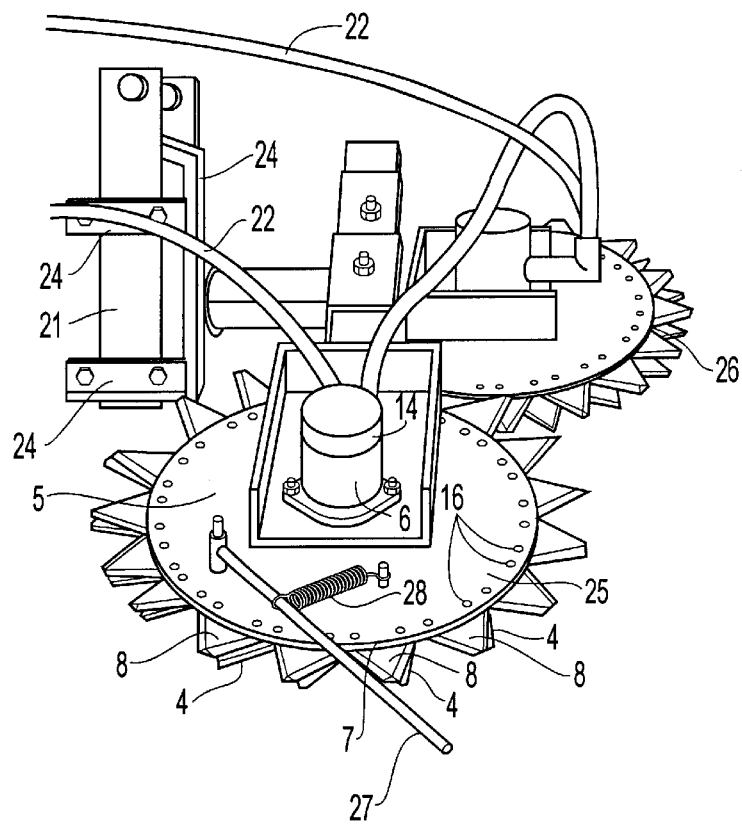
FIG. 1 is a perspective view of a pruning machine according to the invention.
Figure 2:
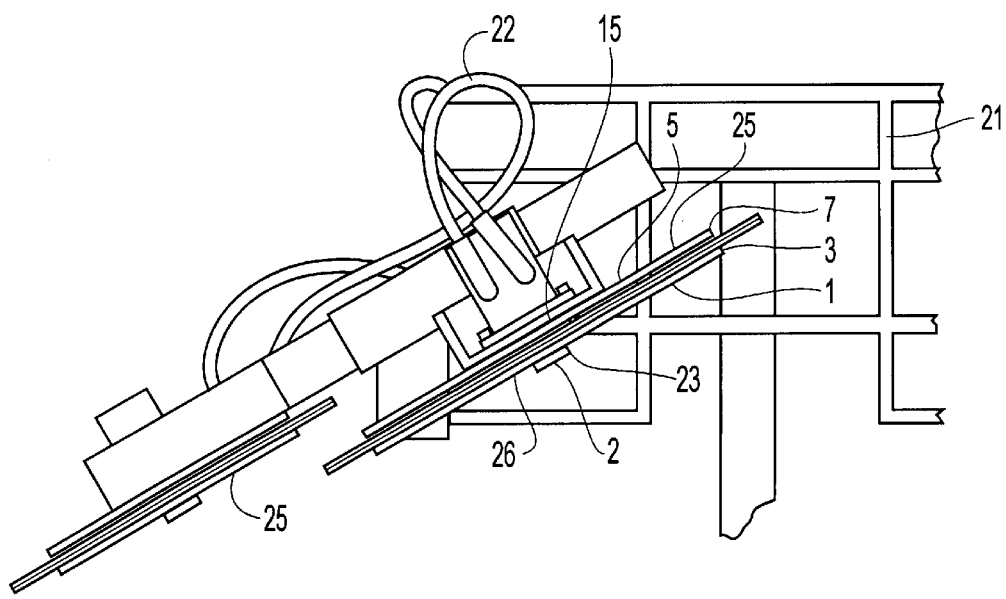
FIG. 2 is a side elevation of the pruning machine of FIG. 1.

The pruning machine illustrated in FIGS. 1 and 2 includes two sets of pruning apparatus, each of which has a first mounting plate 1 (shown in FIG. 2 but not visible in FIG. 1), having a central axis 2 and an outer edge 3. A first set of blades 4 (best seen in FIG. 1) is mounted on first mounting plate 1 and protrudes outwardly from outer edge 3. Second mounting plate 5 has central axis 6 and outer edge 7. Second mounting plate 5 is located close to first mounting plate 1, so that the respective central axes 2,6 and outer edges 3,7 substantially coincide. Second set of blades 8 are mounted on second mounting plate 5 and protrude outwardly from second mounting plate outer edge 7.

Figure 3:
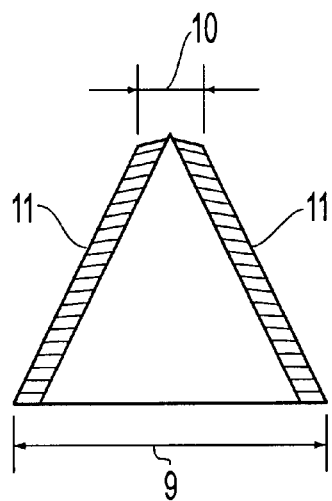
FIG. 3 shows one embodiment of a blade suitable for use in the present invention.
Figure 4:
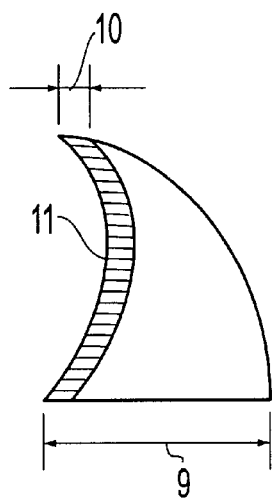
FIG. 4 shows another embodiment of a blade suitable for use according to the present invention.

In operation, first set of blades 4 rotates relative to second set of blades 8 so that scissor-like cutting actions are formed between them. Blades 4 on first mounting plate 1 and/or blades 6 on second mounting plate 5 taper from a broader with 9 (as shown in FIGS. 3 and 4) at the outer edge 3,7 of the respective mounting plate to a narrower width 10 at the point furthest from the central axis 2,6.

In the embodiment illustrated, mounting plates 1,5 are both disc-shaped, although as indicated earlier they may be of any other suitable shape including polygonal or star-shaped. Second mounting plate 5, particularly if it is fixed as shown in the embodiment illustrated, need not be a complete circle; it may be semi-circular in shape or any other suitable shape. As can be seen from FIG. 2, mounting plates 1,5 in the embodiment illustrated are substantially flat. In order to ensure that the mounting plates and the blades can move smoothly as close as possible to each other, recesses 15 are provided in mounting plates 1 and 5 to accommodate the thickness of blades 4,8 so that the surface which each mounting plate presents to the other mounting plate, inclusive of the blades is flush.

Figure 5:
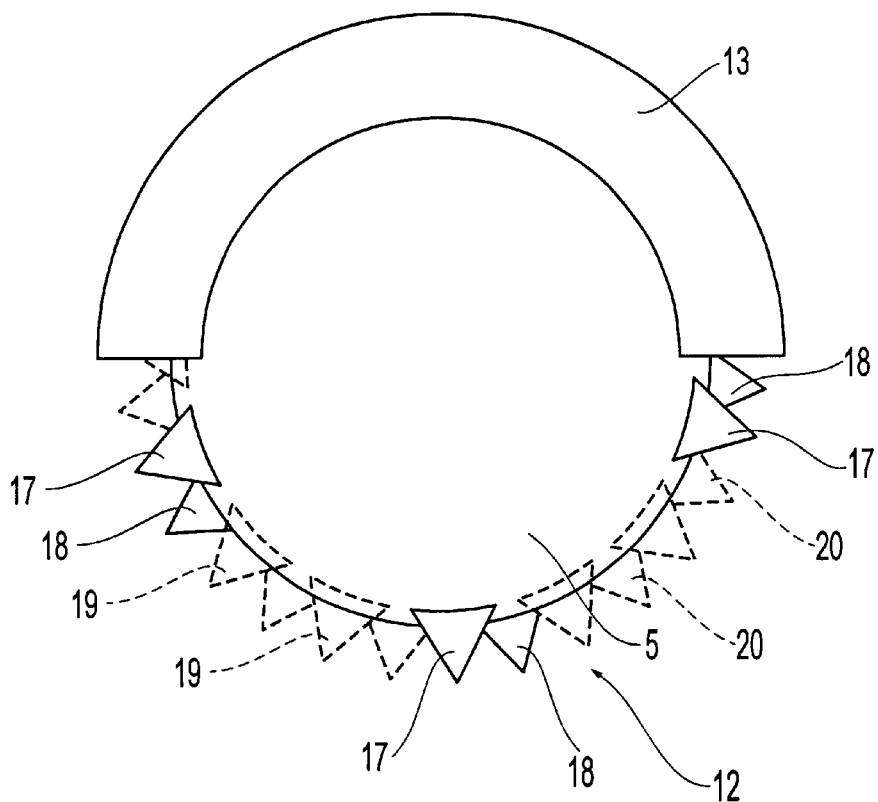
FIG. 5 is a top plan view of apparatus according to an embodiment of the invention.

The blades may be of any suitable shape and configuration. In the embodiment illustrated in FIGS. 1 and 2, first mounting plate 1 has 18 blades evenly spaced around the mounting plate. Mounting plate 5 has nine blades 8 spaced evenly around the front half of the mounting plate, with no blades spaced around the back half. This is because only front half 12 (shown in FIG. 5) actually does any cutting. The back half may optionally be protected with a guard 13 (as shown in FIG. 5).

It has been found through experimentation that in an optimal configuration, the rotating plate has about 8 evenly spaced blades (roughly every second available position), and the fixed plate has 11 blades arranged side-by-side with a guard around the rest of the plate. The apparatus has been found to operate efficiently at a rotational speed of about 250 revolutions per minute, which is about one tenth the rotational speed required for efficient operation of a similarly designed rotary saw. The rotating plate in the apparatus of the invention acts as a flywheel, giving an even rotational force to the blades as they cut.

In the embodiment illustrated, fixed blades 8 on fixed plate 5 protrude by about the same amount as blades 4 on rotating plate 1. However, fixed blades 8 may optionally protrude further than rotating blades 4 in order to protect rotating blades 4 from being damaged when the apparatus approaches a solid object such as a fence post. The extra protrusion of fixed blades may be any suitable amount, with 10 to 20 mm being particularly suitable.

FIG. 3 shows one suitable shape for blades 4,8. The top of the blade has a narrow width 10 and the bottom of the blade has a broader width 9. The bottom of the blade is connected to the mounting plate. As a result of this configuration, any vegetation approaching the pruning apparatus is first confronted with a narrow point on the end of the blade, making it unlikely that the vegetation will be pushed away without being cut.

FIG. 3 shows the triangular blade shape which is the shape used in the embodiments of FIGS. 1, 2 and 5. A serrated edge 11 is provided on the blade to assist in cutting the vegetation and to ensure that the blade gets a firm grip on vegetation during cutting. FIG. 4 shows an alternative shape for the blade, being a "saw-tooth" shape, which resembles a dorsal fin. It will be appreciated that numerous other shapes are also suitable.

Blades 4,8 are preferably easily replaceable when they bend or break. As shown in FIG. 2, blades 8 are affixed to mounting plate 5 by means of bolts or rivets 16. Damaged blades can be removed and replaced very simply by removing and replacing the appropriate bolts or rivets. It is not necessary to disassemble the plates or move any other parts when replacing a blade. It will be appreciated that many other different mounting techniques can be used, and some other such mounting techniques also provide easy and rapid replacement of blades.

Another advantage of easy replaceability of blades arises when it is desired to vary the spacing between blades. In the embodiment illustrated in FIG. 5, two out of every three blades have been replaced. The remaining blades 17 on second mounting plate 5 are shown in solid outline, and the positions for the removed blades 19 are shown in dotted outline. Similarly, the remaining blades 18 on mounting plate 1 (hidden in FIG. 5) are shown in solid outline, and the spaces for removed blades 20 are shown in dotted outline.

FIGS. 1 and 2 show the pruning machine mounted on a tractor or harvester 21. Hydraulic pipes 22 connect from the tractor or harvester to hydraulic motor 14 which causes first mounting plate 1 to rotate. Hydraulic motor 14 is affixed to second mounting plate 5, and the rotating shaft of hydraulic motor 14 is attached by means of bolts 23 to first mounting plate 1, so that first mounting plate 1 rotates with the drive shaft of hydraulic motor 14. The apparatus is disassembled by removing bolts 23, allowing mounting plate 1 to be removed.

Also provided are adjustable mounting components 24, which enable complete control of the height angle and orientation of the pruning apparatus.

As shown in FIGS. 1 and 2, the pruning machine according to the invention includes two sets of pruning apparatus which are mounted next to each other. In the preferred arrangement shown, left hand pruning apparatus 25 normally operates in an anti-clockwise manner and right hand pruning apparatus 26 normally operates in a clockwise manner, when observed from the angle shown in FIG. 1. This means that any vegetation encountered by the two sets of pruning apparatus is directed into the space between the two, with the result that pruning of the vegetation is maximised. However, it is preferred that the directions of rotation be reversible. This permits quick cleaning of blades during a trimming or pruning operation, continued operation if one side of one or more blades becomes damaged, and flexibility in the manner in which the machine is used.

In order to increase the efficiency of pruning still further, a pruning machine according to the invention may include a flexible draw-in device for drawing vegetation in towards the rotating blades. In the embodiment of FIG. 1, the flexible draw-in device comprises arm 27, which is held in place by spring 28. When the machine is being used, for example, to cut grape vines, arm 27 travels close to the vine stems and draws in to the cutting blades canes which would otherwise avoid the pruning process.

Figure 6:
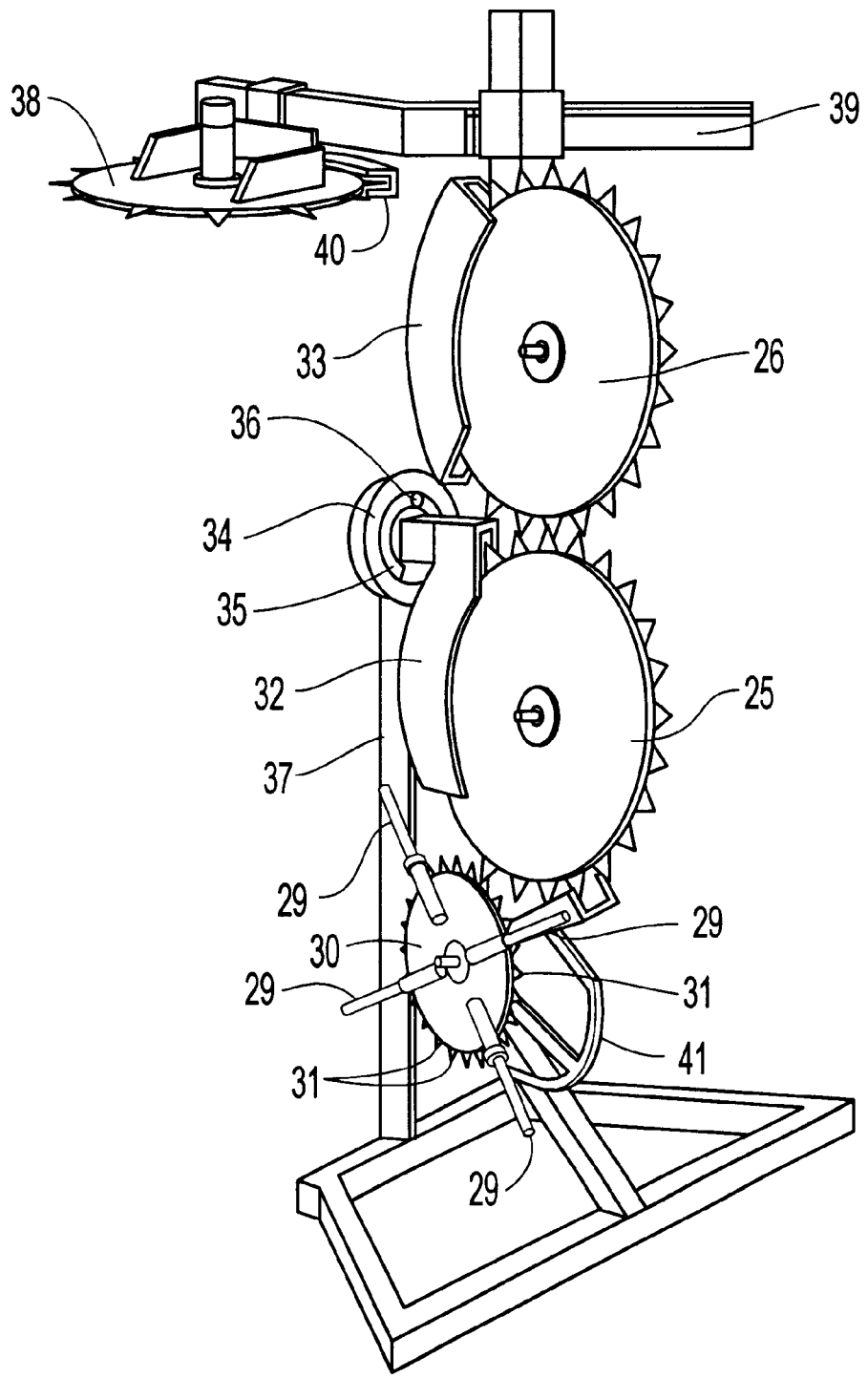
FIG. 6 is a perspective view of a pruning machine including apparatus according to an embodiment of the invention.

An alternative embodiment of the flexible draw-in device is shown as a part of the machine of FIG. 6. In this embodiment, the draw-in device includes four rotating flexible arms 29. The draw-in device further includes an additional set of mounting plates 30 with blades 31, acting as an additional pruning apparatus. The additional pruning apparatus as shown is smaller in diameter then the main sets 26 and 25, and has few blades. A guard 41 is provided on the draw-in device, which is spring-retractable. When the guard hits a solid object such as a post, the draw-in device retracts so that damage to the blades is avoided.

The machine of FIG. 6 further includes blade guards 32 and 33 around the non-cutting side of pruning apparatus 25 and 26 respectively. In the embodiment illustrated, only one of the mounting plates is visible on each of apparatus 26 and 25 and the additional apparatus comprised of mounting plates 30 and blades 31. In each case, the mounting plate which can be seen is the one which rotates, whereas the one on the side which cannot be seen is fixed, has blades missing in the region of blade guards 32 and 33 (because such blades are unnecessary as they perform no cutting function), and has pneumatic motors and hoses (not visible) attached to it to drive the rotating mounting plates.

Figure 7:
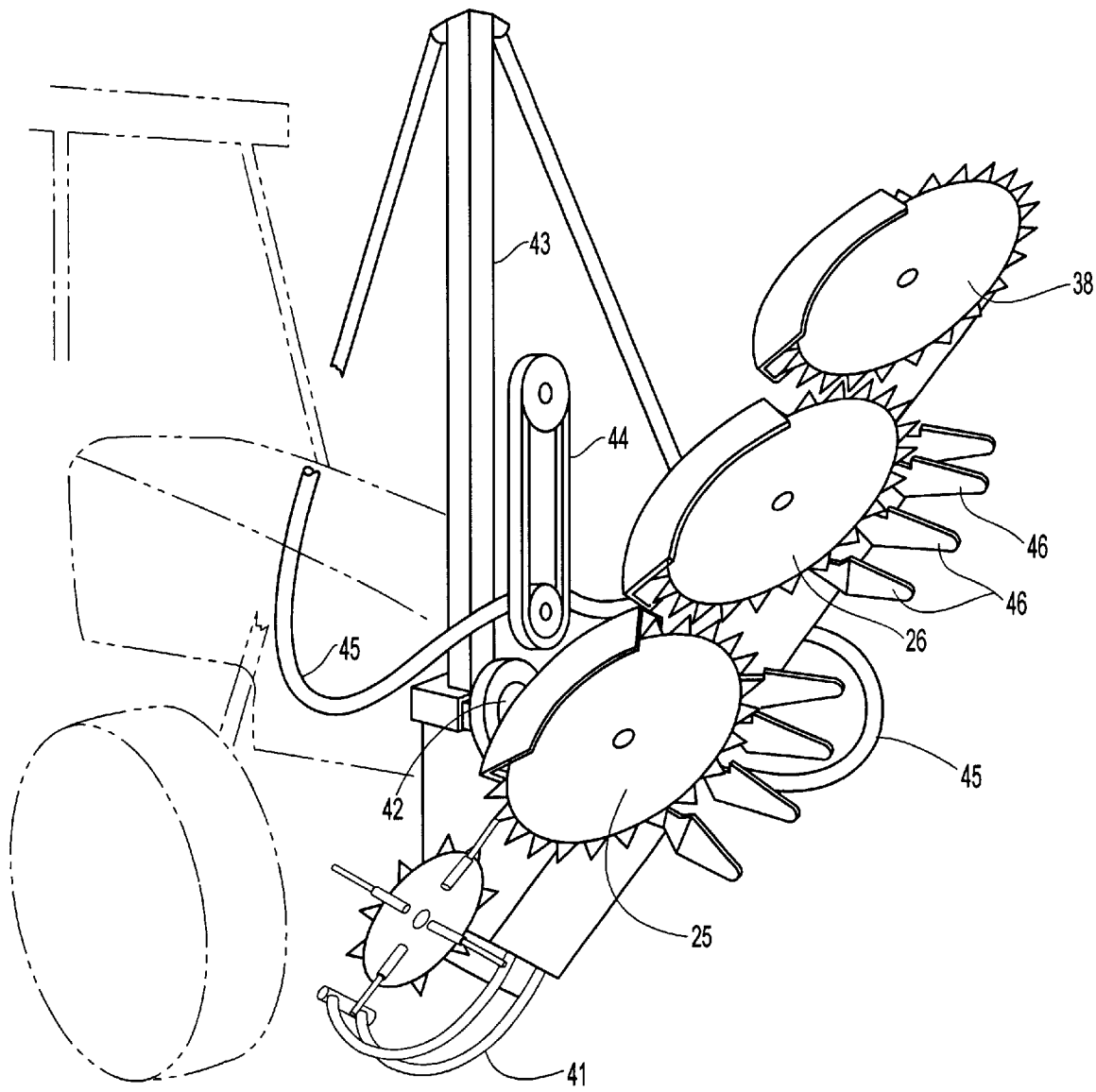
FIG. 7 is a perspective view of a further embodiment of the invention.

The machine of FIG. 6 is attachable to a tractor, harvester, or other supporting machinery by means of mounting arm 37 and angular adjustment means 34. Angular adjustment means 34 includes slot 35 and pin 36. As the angular orientation of the machine is varied, pin 36 moves within slot 35. When the desired orientation is achieved, the machine can be fixed in position by tightening a nut on pin 36. Alternatively, a hydraulic ram or other such mechanical device may be used to fix the machine in the appropriate orientation. Another arrangement which has been found to be suitable involves using a stub axle in place of the slot-and-pin arrangement of angular adjustment means 34. This is illustrated in FIG. 7, which shows stub axle 42. The degree of angular rotation of the stub axle is not limited by the length of slots.

Adjustability of angular orientation is desirable because in some pruning applications it may be desirable to have the machinery in a substantially vertical orientation, as shown in FIG. 6, whereas in others, such as green trimming under a row of vines, a horizontal or oblique orientation such as those shown in FIGS. 1 and 2 may be desirable. In some circumstances, it may be necessary to adjust the orientation of the pruning machinery during the pruning operation. For example, a field planted with rows of vines may have parts that are on a slope. It may be desirable that the vines be pruned consistently in a vertical manner, and the orientation of the tractor or other supporting machinery may vary, depending upon the slope of the land being traversed. Compensatory adjustment of the angular orientation of the pruning machinery may therefore be necessary.

Figure 8:
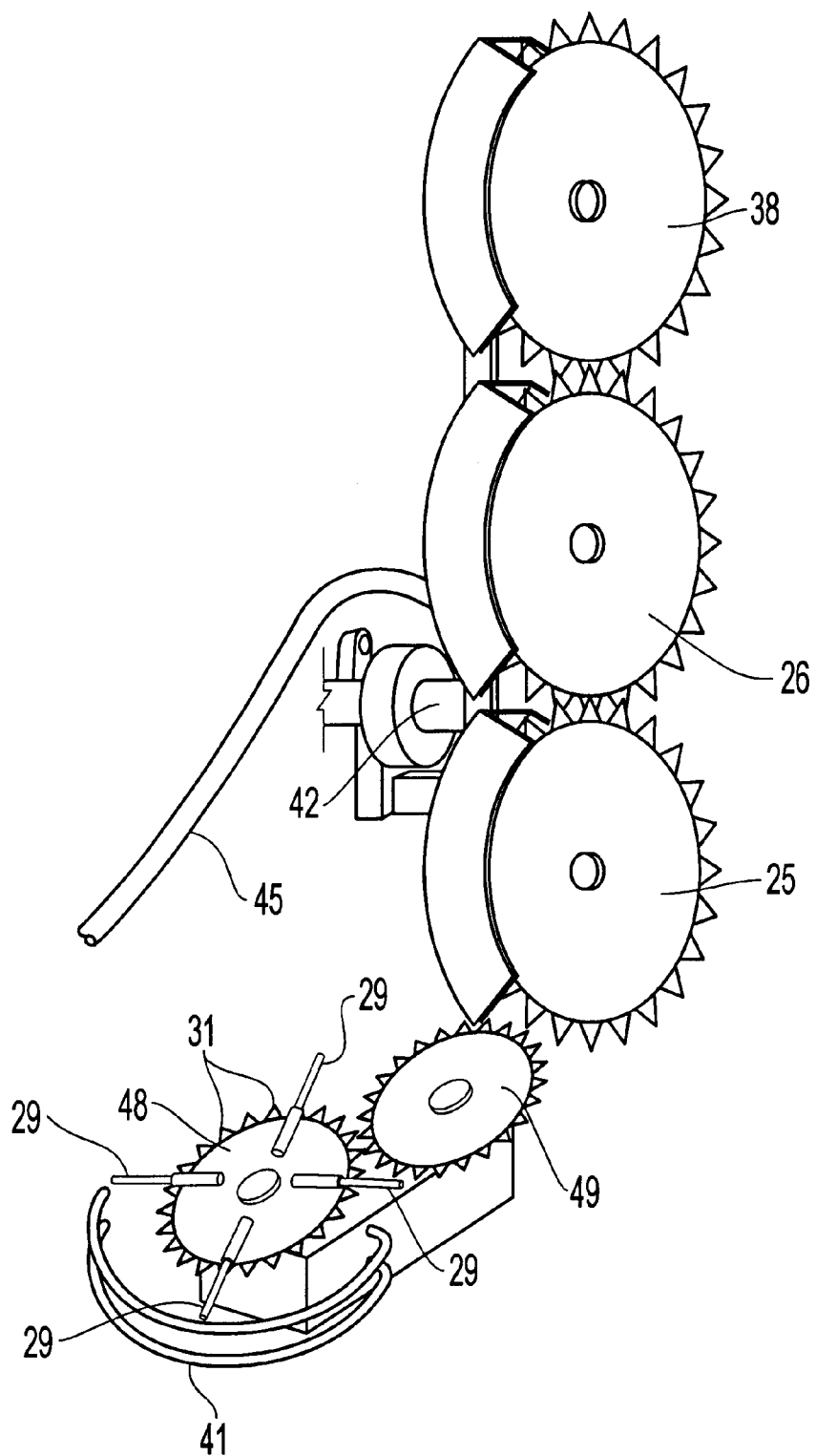
FIG. 8 is a perspective view of a further embodiment of the invention.

The apparatus shown in FIG. 6 also includes a further set of pruning apparatus 38, arranged at an angle of about 90 degrees to sets 26 and 25. This enables the top of a row of vines to be pruned at the same time as the side is pruned, in a "box pruning" configuration. The apparatus as shown in FIG. 6 also includes blade guard 40 for further pruning set 38, and adjustment means 39 allowing adjustment of the position and angular orientation of further pruning set 38 relative to sets 28 and 25. Apparatus 38 may be held in place by a hydraulic ram (not shown), which can be used to retract the apparatus when a fixture such as a sprinkler or post is encountered, or it may be held in place by a manually adjustable arm which is spring-retractable. Desirably, additional set of apparatus 38 is adjustable between a configuration in which it is at right-angles to sets of apparatus 25 and 26, as shown in FIG. 6, and a configuration in which all three sets of apparatus are lined up in a row, as shown in FIGS. 7 and 8.

In another embodiment of the pruning machinery of FIG. 6, another pair of vertically oriented sets of pruning apparatus may be provided to the left of further set 38, facing toward sets 26 and 25. This enables both sides and the top of a row of vines to be pruned at the same time.

One style of grape harvester consists of a tall machine which straddles a row of vines. As the harvester moves forward, the row of vines passes through the middle underneath the cabin. It will be appreciated that this type of harvester is readily adaptable to incorporate the pruning apparatus of the present invention, so that both sides and the top of a row of vines are pruned simultaneously as the harvester straddles the row.

Referring now to FIG. 7, there are shown some further enhancements. The pruning machine is attached to a tractor by means of stub axle 42 and mast 43. The rotation of stub axle 42 (and hence the angular orientation of the pruning machine) is varied by movement of chain 44. Hydraulic hoses 45 extend from the tractor's hydraulic system to a motor on the underside of each set of pruning apparatus (not visible). Also shown in FIG. 7 are optional "fingers" 46, extending forwardly from two of the sets of pruning apparatus 25 and 26. These fingers help to guide vegetation into the cutting blades, preventing it from being deflected sideways around the blades.

Figure 9:
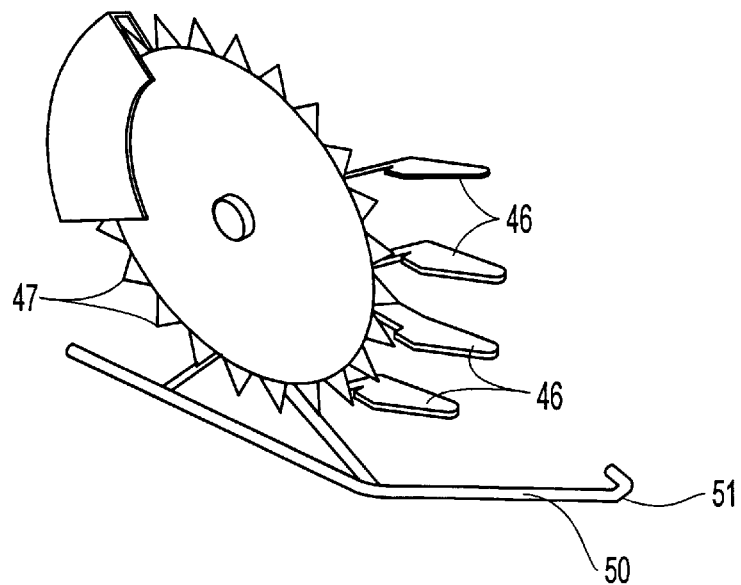
FIG. 9 is a detail view of a set of pruning apparatus in conjunction with a vine deflector.

The "fingers" 48 can be seen more clearly in FIG. 9, which shows a close-up of one set of pruning apparatus. Each "finger" 48 extends forwardly from the tip 47 of one of the blades attached to the lowermost plate (not visible), which is the fixed plate in the embodiment illustrated. The visible top plate is the rotating plate.

FIG. 8 shows an arrangement in which three sets of pruning apparatus 25, 26 and 38 are aligned vertically, and two additional sets 48 and 49 are arranged at the bottom, next to each other in a near-horizontal orientation. Set 48 is a re-deployed version of the flexible draw-in device shown at the bottom of FIG. 6, incorporating flexible arms 29 and cutting blades 31, as well as guard 41. Pruning apparatus set 49 is a smaller version of sets 25 and 26, similar in size to set 48 but without the flexible arms 29. Reconfiguration of the apparatus between the arrangements shown in FIGS. 6, 7 and 8 can be achieved by simple adjustments to the framework on which the various sets of pruning apparatus are located.

The arrangement in FIG. 8 is particularly suitable for green trimming of vines prior to mechanical grape harvesting. Mechanical grape harvesting usually involves a machine which straddles the vine, shaking the fruit off the vine onto a plate below the vine. Grape clusters are typically located close to the centre of the vine, and mechanical harvesting works best if excess foliage outside and below the grapes is removed. The arrangement shown in FIG. 8 is designed to optimise such trimming. An angular orientation as shown in FIGS. 1, 2 and 7 can be used, but the configuration of FIG. 8 is the optimum.

FIG. 9 shows an optional additional feature, vine deflector 50. Vine deflector 50 pushes back the trunks of vines as the pruning machine approaches, reducing the likelihood of the trunks being damaged. Vine deflector 50 projects forwardly of the pruning machine as far as front edge 51.

Figure 10:
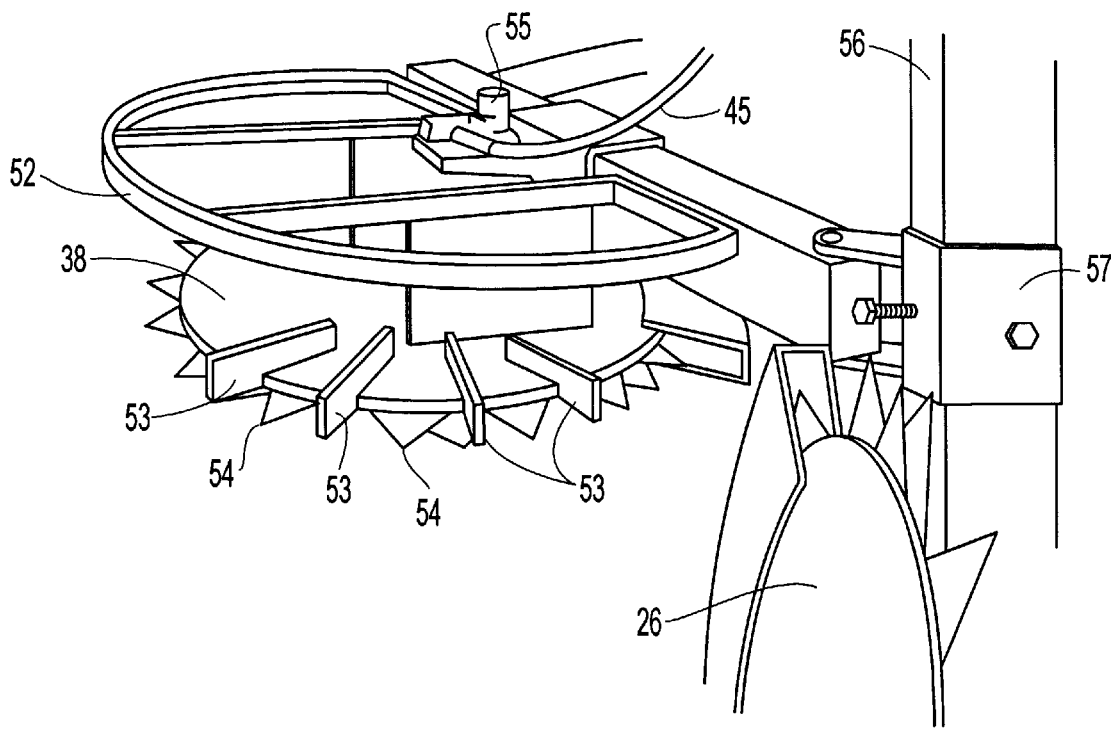
FIG. 10 is a detail view of a horizontally oriented set of pruning apparatus for use in box pruning.

FIG. 10 shows a detail view of an enhanced version of top pruning apparatus set 38. This arrangement includes guard 52, which helps ensure that damage is not caused by collisions with such things as sprinklers and fence posts. Dividers 53 are provided at the front of pruning apparatus set 38. It will be seen that dividers 53 are different from the fingers 46 shown in FIG. 9, and they perform a different function. Whereas fingers 46 extend outwardly from the tips of blades, dividers 53 are positioned in between the tips 54 of the blades on the fixed (uppermost) plate of set 38. The rotating plate is the underneath plate (not visible). The function of dividers 53 is to halve the distance which a stem or twig may travel between blades in a pruning operation, thereby lowering the risk that the part of the stem or twig remaining on the vine will be split. Split ends can cause problems such as allowing disease to enter the vine.

FIG. 10 also shows hydraulic motor 55 which operates set 38, and hose 45 leading to hydraulic motor 55. The Figure also shows framework 56 on which the various sets of apparatus are mounted, including set 26, and adjustable mounting bracket 57 which allows pruning apparatus set 38 to be mounted in the right-angle configuration shown in FIG. 10 or in the three-in-a-line configuration shown in FIGS. 7 and 8.

It is to be understood that various alterations additions and/or modifications may be made to the parts previously described without departing from the ambit of the invention.

What is claimed is:

1. A pruning machine, for pruning or trimming a row of vines or other plants, including:
   I. a first set of pruning apparatus including:
      (a) a first mounting plate having a central axis and an outer edge;
      (b) a first set of blades mounted on the first mounting plate and protruding outwardly from the outer edge;
      (c) a second mounting plate having a central axis and an outer edge located close to the first mounting plate so that the respective central axes and outer edges substantially coincide; and
      (d) a second set of blades mounted on the second mounting plate and protruding outwardly from the second mounting plate outer edge;
   wherein in operation, the first set of blades rotates relative to the second set of blades so that scissor like cutting actions are formed between them;
   and wherein the at least one of the first set of blades and the second set of blades taper from a broader width at the outer edge of the respective mounting plate to a narrower width at the point furthest from the central axis;
   and
   II. a second set of pruning apparatus having the same features as the first set;
   wherein the two sets of pruning apparatus are mounted side by side such that they form a cutting tool for cutting one side of the row of vines or other plants, the cutting tool having a length which is approximately the sum of the diameters of the first set of pruning apparatus and the second set of pruning apparatus.

2. A pruning machine according to claim 1 wherein each of the blades tapers from a relatively broad width at the point at which the blades begin protruding outwardly from their respective mounting plate to a relatively narrow width or point at the part of the blade most distant from the mounting plate.

3. A pruning machine according to claim 2 wherein the blades are triangular in shape, with the base of the triangle being fixed to the mounting plate and the apex of the triangle being the outer-most part of the blade.

4. A pruning machine according to claim 1 wherein the blades are removable and replaceable on the mounting plates, and recesses are provided in the mounting plates for the attachment of the blades, so that the faces of the mounting plates including the blades as presented to each other are relatively smooth, ensuring smooth operation during rotation, and enabling the first set of blades to pass as close as possible to the second set of blades.

5. A pruning machine according to claim 1 wherein the blades have serrated edges.

6. A pruning machine according to claim 1 wherein the rotating blades operate in opposite directions such that vegetation is urged by the rotating blades towards the centre of the two sets of pruning apparatus.

7. A pruning machine according to claim 1 further including a flexible draw-in device for drawing vegetation in towards the rotating blades.

8. A pruning machine according to claim 7 wherein the flexible draw-in device includes rotating flexible arms.

9. A pruning machine according to claim 8 wherein the flexible draw-in device includes a further pair of mounting plates with outwardly protruding blades, at least one of the plates rotating relative to the other to provide a scissor-like cutting effect.

10. A pruning machine according to claim 7 including one or more further sets of pruning apparatus arranged at an angle relative to the first and second sets, enabling the apparatus to cut vegetation to a predefined shape.

* * * * *